(12) United States Patent
John et al.

(10) Patent No.: US 11,478,849 B2
(45) Date of Patent: Oct. 25, 2022

(54) CAPSULE FOR ISOSTATIC PRESSING AND METHOD

(71) Applicant: Bodycote H.I.P. Limited, Macclesfield (GB)

(72) Inventors: David John, Macclesfield (GB); Susan Davies, Macclesfield (GB)

(73) Assignee: BODYCOTE H.I.P. LIMITED, Macclesfield (GB)

( * ) Notice: Subject to any disclaimer, the term of this patent is extended or adjusted under 35 U.S.C. 154(b) by 348 days.

(21) Appl. No.: 16/626,955

(22) PCT Filed: Jul. 3, 2018

(86) PCT No.: PCT/GB2018/051872
§ 371 (c)(1),
(2) Date: Dec. 27, 2019

(87) PCT Pub. No.: WO2019/008348
PCT Pub. Date: Jan. 10, 2019

(65) Prior Publication Data
US 2020/0139439 A1 May 7, 2020

(30) Foreign Application Priority Data
Jul. 5, 2017 (GB) ..................................... 1710787

(51) Int. Cl.
*B22F 3/15* (2006.01)
*B33Y 80/00* (2015.01)
*B22F 5/00* (2006.01)

(52) U.S. Cl.
CPC ................ *B22F 3/15* (2013.01); *B22F 5/009* (2013.01); *B33Y 80/00* (2014.12); *B22F 2003/153* (2013.01)

(58) Field of Classification Search
CPC ....... B22F 3/15; B22F 2003/153; B33Y 80/00
See application file for complete search history.

(56) References Cited

U.S. PATENT DOCUMENTS

| 5,640,667 A | 6/1997 | Freitag et al. |
| 10,780,501 B2 | 9/2020 | Wu |

(Continued)

FOREIGN PATENT DOCUMENTS

| CN | 104858430 A | 8/2015 |
| EP | 2236229 A1 | 10/2010 |

(Continued)

OTHER PUBLICATIONS

International Search Report for International application PCT/GB2018/051872 dated Sep. 28, 2018, 4 pages.

(Continued)

*Primary Examiner* — James Sanders
(74) *Attorney, Agent, or Firm* — Shumaker, Loop & Kendrick, LLP

(57) ABSTRACT

A capsule 2 for HIPing comprises a rigid, self-supporting additive manufactured (AM) component 3 which is welded to inner and outer cylindrical liners 4, 6 through which cooling channel tubes 8, 10 extend. A solid end plate 11 is welded to ends of the liners 4, 6 and tubes 8, 10 extend through the end plate 11 and open to the outside. A fill tube 12 communicates with an annular void 14 defined between liners 4, 6 which is filled with powder 16. In use, the capsule 2 is subjected to Hot Isostatic Pressing (HIP). Thereafter, the inner and outer liners 4, 6 are removed to define a valve seat assembly comprising the AM component 3, tubes 8, 10, HIPed powder 16 and end plate 11.

28 Claims, 7 Drawing Sheets

(56) References Cited

U.S. PATENT DOCUMENTS

| | | |
|---|---|---|
| 2016/0258298 A1 | 9/2016 | Channel et al. |
| 2017/0021423 A1 | 1/2017 | Berglund et al. |
| 2017/0314402 A1 | 11/2017 | Schloffer et al. |
| 2018/0304366 A1 | 10/2018 | Vannerot |

FOREIGN PATENT DOCUMENTS

| | | |
|---|---|---|
| EP | 3072611 A2 | 9/2016 |
| EP | 3072611 A3 | 10/2016 |
| EP | 3239468 A1 | 11/2017 |
| GB | 2562533 A | 11/2018 |
| GB | 2570618 A | 8/2019 |
| JP | 2016-199804 A | 12/2016 |
| JP | 2017-515973 A | 6/2017 |
| WO | 2015057761 A1 | 4/2015 |
| WO | 2015181080 A1 | 12/2015 |
| WO | 2016001368 A1 | 1/2016 |
| WO | 2017/068300 A1 | 4/2017 |
| WO | 2017112711 A1 | 6/2017 |
| WO | 2019008348 A1 | 1/2019 |

OTHER PUBLICATIONS

United Kingdom Search Report for application GB1710787.1 dated Jan. 10, 2018, 5 pages.
International Write Opinion of the International Search Authority for International application No. PCT/GB2018/051872 dated Sep. 28, 2018, 8 pages.
Notification of Grant GB Patent 2570618 (for GB App. 1710787.1) dated Apr. 20, 2021 (2 pages).
Notice of Intention to Grant under Section 18(4) for GB App. 1710787.1 dated Mar. 1, 2021 (2 pages).
Second Examination Report Under Section 18(3) for GB App. 1710787.1 dated Aug. 28, 2020 (4 pages).
First Examination Report Under Section 18(3) for GB App. 1710787.1 dated Sep. 30, 2019 (5 pages).
Search Report for GB App. 1710787.1 dated Jan. 10, 2018 (5 pages).
Japanese Patent Application No. 2019-571693 dated Jul. 26, 2022 (8 pages).

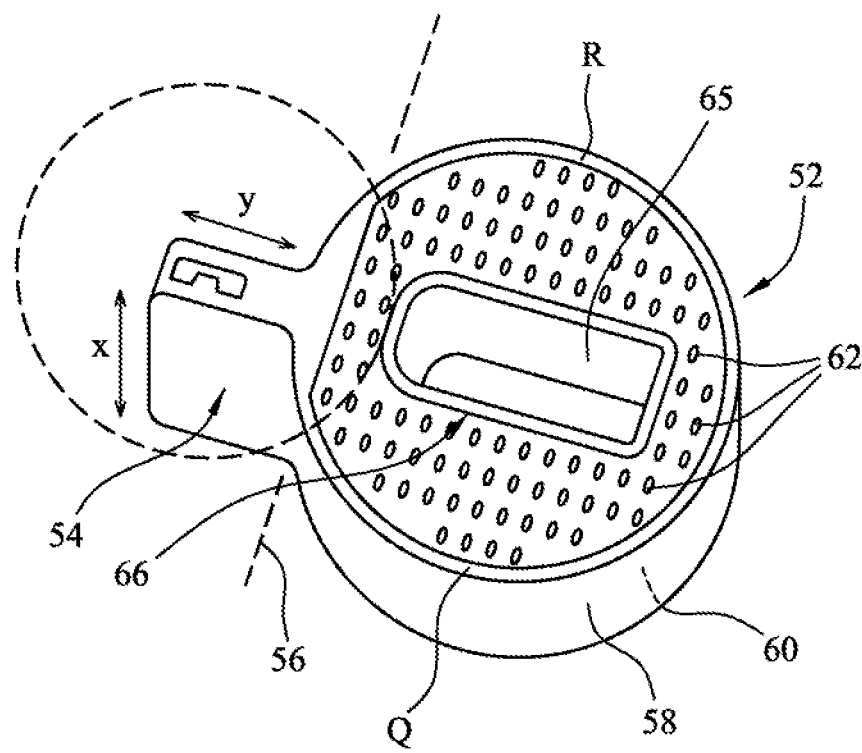
FIG. 7a
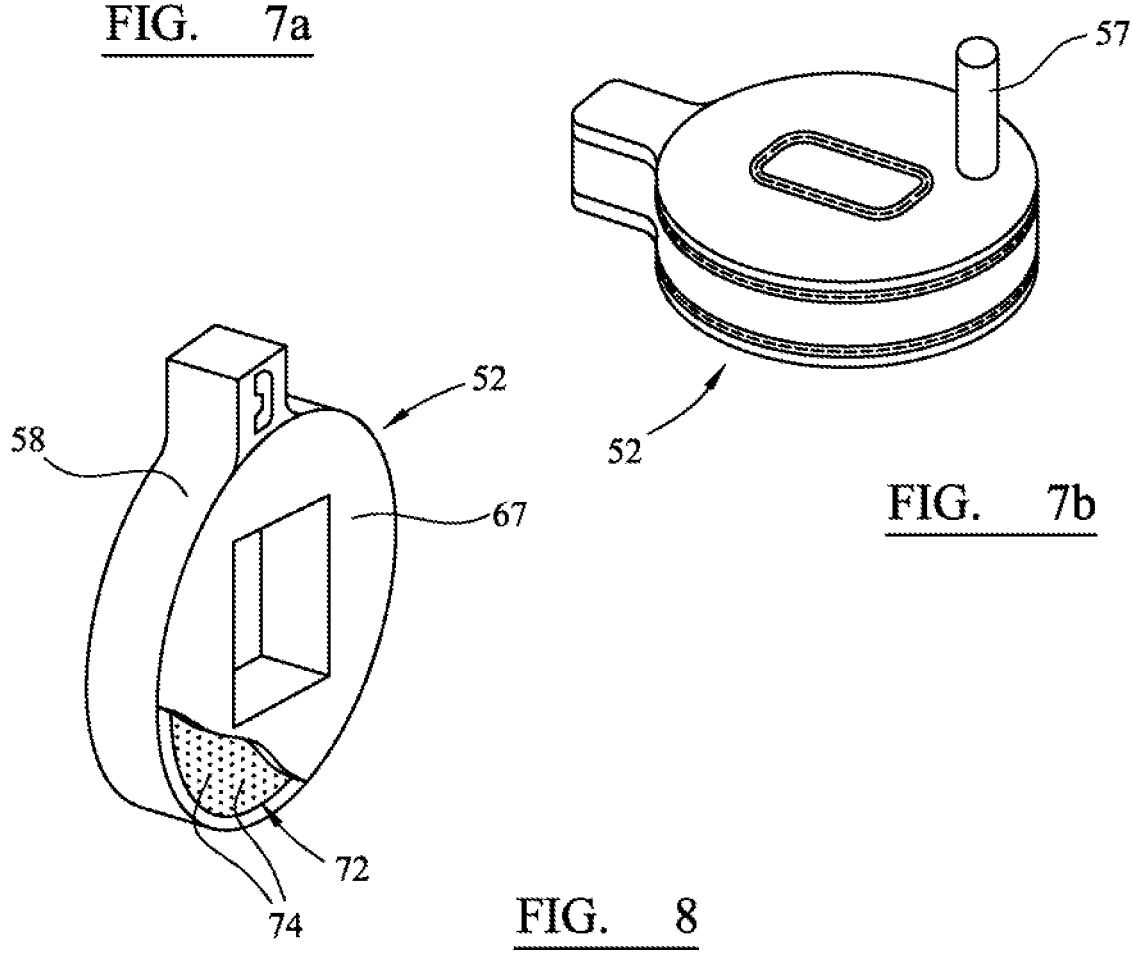
FIG. 7b
FIG. 8

CAPSULE FOR ISOSTATIC PRESSING AND METHOD

CROSS REFERENCE TO RELATED PATENT APPLICATIONS

This application claims the benefit of and priority to PCT/GB2018/051872 filed Jul. 3, 2018 which claims the benefit of and priority to Great Britain Application No. 1710787.1 filed on Jul. 5, 2017.

TECHNICAL FIELD AND BACKGROUND OF THE INVENTION

The invention relates to components and particularly, although not exclusively, relates to a method of making metallic components, components made in the method per se and a capsule for use in making the components. Preferred embodiments involve the use of Hot Isostatic Pressing (HIP).

Due to the ever increasing demands to produce complex-shaped components with enhanced properties on selected surfaces (e.g. to increase resistance to corrosion, wear or abrasion) in pumps, pipes, valves, manifolds and general components, in, amongst others, oil and gas, chemical, petrochemical, nuclear and general industrial application, the need to produce multi-metallic components which are suited to meet stringent requirements is increasing. Conventional manufacturing methods for the manufacture of complex components including a bi-metallic material element is normally limited to weld overlay, brazing or mechanical overlay of individually machined, cast or wrought components. The problem associated with these techniques is that the placement and interface between the two materials has to be easily accessible and of a simple design. Even with a simple design interface there is a high risk of failure of the weld, braze or mechanical bond which increases the need for expensive inspection techniques and can lead to re-machining and re-work of the component which significantly increases manufacturing costs.

Production of relatively complex shaped components using powder metallurgy (PM) HIP, is an established manufacturing method, where a mild steel sheet capsule encapsulates and defines the shape of metal powder, which is then subject to HIP consolidation, to produce a single, near net shape component with homogenous microstructural and mechanical properties. However, consistency in the shaping and forming of sheet metal capsules for small to medium size components (less than 50 kg in weight) is difficult and the PM HIP technology lends itself better to larger components. In addition the placing and control of interfaces between two different powder alloys within a capsule is difficult to accurately control.

The use of additive manufacturing (AM)/3D printing techniques is growing rapidly and the manufacture of extremely complex component designs is well established. However, the manufacture of bi-metallic AM builds can be challenging and the majority of builds tend to be single material, with a build size limited to a maximum dimension of about 500 mm. Build time is a function of size, wall thickness and quality of build, and builds can take three to five days for large or thick walled sections.

As the build time increases for laser systems, the vacuum in the build chamber decreases which results in the laser optics becoming contaminated which diminishes their focusing capacity and the accuracy of the laser. The decrease in vacuum level also affects powder build quality resulting in a change in material properties throughout the build. Advancement in AM technology is growing rapidly, but the ability to manufacture large diameter parts over 1 m length is limited to wire fed systems and the surface finish is not usable in the as built condition for most engineering applications.

It is desirable to limit post-manufacture machining of components after their production in for example PM HIP or additive manufacturing/3D printing process by production of selective surfaces in the production process. Selective surfaces are areas (or surfaces) of a component which are manufactured to a relatively close tolerance (e.g. to +/−0.3%, with a lower limit of 0.3 mm) and/or are dimensionally controlled such that they do not require post-manufacture machining. The components may need to include such selective surfaces due to the location and/or function of the selective surface in a finished component.

It is an object of the present invention to address limitations of the aforementioned processes.

It is an object of the present invention to produce components, for example relatively large components, with selective surfaces.

It is an object of the present invention to produce relatively large components with selective surfaces in a relatively rapid and/or efficient manner.

According to a first aspect of the invention, there is provided a capsule for hot isostatic pressing (HIPing), said capsule comprising:

(i) an additive manufactured (AM) element;
(ii) a capsule element (A), wherein said capsule element (A) is arranged to define at least part of a void for containing a powder (herein referred to as "powder (XX)") arranged to be subjected to hot isostatic pressing (HIP).

Said AM element preferably includes a selective surface. Such a selective surface may define a relatively complex shape and/or may be made to a relatively narrow tolerance band, subject to the size of the selective surface. Said selective surface may be arranged to cooperate with and/or contact, after HIPing, in use, a surface of a co-operable part (which may also be a complex shape and/or be made to a relatively narrow tolerance band). For example, said selective surface of said AM element may define a valve seat which is arranged to cooperate with a valve member; or may define an array of teeth arranged to cooperate and/or mesh with another component or another array of teeth.

Said capsule is preferably arranged to produce a hot isostatically pressed (HIPed) component after HIPing, wherein said AM element defines at least part of, for example the whole of, a selective surface in the HIPed component. The AM element may include a selective surface when in said capsule, wherein said selective surface is arranged, after HIPing, to define substantially the same shaped selective surface, except there may be shrinkage of the AM component as a result of the HIPing process. It is believed that a skilled person in the art can determine which surfaces are intended to be and/or are selective surfaces in a HIPed component and/or in an assembly incorporating a HIPed component. For example, a selective surface may be seen to have defined properties designed to meet specifications and performance criteria. A selective surface may have tighter dimensional tolerance or material properties such as corrosion resistance, heat resistance or wear resistance.

The AM element may define a relatively complex shape and/or configuration. It preferably includes an opening, for example a through passage, which suitably extends from a first position on the AM element to a second position on the element. A void is suitably defined between the first and second positions, suitably within the AM element. The AM element may define a plurality of passages. It may include passages which extend transversely to one another at least in part. It may include a plurality of voids. For example, in addition to the provision of a void between said first and second positions, it may include a void between third and fourth positions, wherein suitably said third and fourth positions are spaced from said first and second positions.

Said AM element may include a passage having a cross-section which is not symmetrical about two mutually orthogonal axes. Such cross-section may be irregular in shape. Said passage may be elongate. The maximum dimension of the cross-section of the passage may be less than 80% or less than 20% of the length of the passage.

Said AM element may include an array (e.g. including at least 10 or at least 20 members) of substantially identical parts, for example teeth. Said AM element may include an array of substantially identical parts disposed about an axis, for example defining an outer surface of the AM element which is curved, for example substantially circular.

Said AM element may include a first volume which has a density of 98% (of its fully dense density) or greater. The density of the first volume may be less than 100% (of its fully dense density), less than 99.5% (of its fully dense density), or less than 99.0% (of its fully dense density). Suitably, no part of said element has a density of greater than 99.5% (of its fully dense density), for example greater than 99.9% (of its fully dense density). Said first volume preferably incorporates a selective surface as described. Said AM element may include a second volume which has a density of 98% (of its fully dense density) or greater. The density of the second volume may be less than 100% (of its fully dense density), less than 99.5% (of its fully dense density) or less than 99.0% (of its fully dense density). Said second volume preferably does not incorporate a selective surface as described.

In a first embodiment, said AM element is preferably fully consolidated. That is, preferably said AM element is substantially homogenous and/or comprises a single mass of material. The density of the mass of material which is incorporated in the AM element is preferably substantially constant across its entire extent. Said AM element preferably does not include any powderous material, for example free-flowing powder, for example within a void defined in the AM element. In the first embodiment, said AM element may have a density of 98% (of its fully dense density) or greater. The density of the AM element may be less than 100% (of its fully dense density), less than 99.5% (of its fully dense density), or less than 99.0% (of its fully dense density).

In a second embodiment, said AM element may not be fully consolidated. In this case, it may not be substantially homogenous and/or may not comprise a single mass of material and/or the density of the mass of material which is incorporated in the AM element may not be substantially constant across its entire extent. In the second embodiment, said AM element may include unconsolidated powder. In the second embodiment, said AM element may include a first volume which comprises consolidated powder and/or has a density of 98% (of its fully dense density) or greater. In this case, the first volume may have a density of less than 100% (of its fully dense density), less than 99.5% (of its fully dense density) or less than 99.0% (of its fully dense density). In the second embodiment, said AM element may include a second volume which has a density which is less than that of the first volume, for example due to it having unconsolidated powder. The density of the second volume may be less than 80% (of its fully dense density), for example less than 70% (of its fully dense density). The density of the second volume may be at least 50% (of its fully dense density), for example in the range 50-65% (of its fully dense density).

In the second embodiment, the unconsolidated powder may comprise powder which is flowable, for example within a volume (A) defined in the AM element. The volume (A) may be fully enclosed, for example by a solid wall of the AM element, to prevent any leakage of powder therefrom.

Said volume (A) may comprise support elements, for example support posts, which may extend between upper and lower walls which define volume (A) and, preferably, are arranged to support parts of the AM component, for example said upper wall, during manufacture of the AM element. Said volume (A) may include an array of support elements, for example support posts. Said volume (A) may include at least 5, at least 20 or at least 40 support elements, for example support posts. Said volume (A) may include less than 1000 or less than 500 support elements, for example support posts. The support posts may have a thickness of at least 0.1 mm, for example in the range 0.1 to 1 mm.

In volume (A), the ratio of the sum of the cross-sectional areas of the support elements, for example support posts (immediately below a supported wall of the AM component, for example an upper wall, which the support elements support during manufacture of the AM element) divided by the area defined between the support elements (immediately below the supported wall) in which unconsolidated powder is arranged, may be in the range 0.25 to 0.55, preferably in the range 0.3 to 0.45, more preferably in the range 0.33 to 0.42.

In volume (A), the ratio of the sum of the volumes occupied by all of the support elements, for example support posts, divided by the volume surrounding the support elements, and/or occupied or occupiable by unconsolidated powder may be in the range 0.25 to 0.55, preferably in the range 0.3 to 0.45, more preferably in the range 0.33 to 0.42.

In said second embodiment, said volume (A) and/or any wall which defines volume (A) preferably does not incorporate a selective surface.

Said second volume referred to may be equivalent to said volume (A).

In said second embodiment, said AM element of said capsule for HIPing may comprise the direct product of an AM process for making the AM element (referred to as a "direct AM element") as hereinafter described or may comprise an AM element (referred to as a "supplemented AM element") wherein additional powder has been incorporated into an AM element which is the direct product of an AM process (i.e. is a direct AM element). The additional powder may have the same chemical identify as powder in the supplemented AM element. The additional powder may have a different particle size distribution compared to that in the supplemented AM element. Additional powder is suitably added to increase the density of powder in the supplemented AM element.

In preferred embodiments, including said first and second embodiments, said AM element is made from and/or consists of a single type of material. Said AM element preferably comprises metal which may be an alloy. Said AM element is preferably resistant to etching by acids.

Said AM element may comprise, preferably consist essentially of, a material selected from low alloy steel, austenitic stainless steel, nickel based alloys, Co—Cr, titanium alloys and duplex and super duplex stainless steels.

Said AM element is preferably designed and constructed to be sufficiently strong so it can define part of said capsule. It is preferably able to hold a gas tight (e.g. to helium) seal and retain this gas tight membrane during HIP at high temperatures and pressures. Said AM element is preferably made from a weldable material and/or is sufficiently strong that it can be welded to other regions of said capsule which are not defined by said AM element.

In preferred embodiments, the outer shape and/or entire outer surfaces of the AM element are a direct product of an AM manufacturing technique, with said AM element requiring minimal or substantially no metal removal, e.g. by machining, prior to incorporation into said capsule.

Said AM element is preferably rigid and self-supporting.

Said AM element may represent at least 5 wt %, preferably at least 10 wt %, of the weight of said capsule.

Said AM element may have a maximum dimension of at least 50 mm, for example at least 250 mm.

Said capsule may have a maximum dimension of at least 250 mm, for example at least 500 mm.

Preferably, said AM element is arranged to define at least part of a void for containing powder (XX). Said AM element may define a wall of a void for containing powder (XX). Said wall of said void may be planar, at least in part. Preferably at least 50%, more preferably at least 80%, or even 90%, of the area of the wall of the AM element which defines a wall of said void is planar.

Capsule element (A) may be secured to (preferably directly to) the AM element. Said capsule element (A) may overlie at least part of said AM element. It may be arranged to overlie an opening, for example a channel or pipe section, of said AM element. Said capsule element (A) and AM element are preferably secured, for example welded, so that a gas tight (e.g. to helium) seal is defined between the two elements.

Said capsule element (A) may be made from the same material or a different material compared to that of said AM element. Preferably, capsule element (A) is made from a different material compared to that of said AM element.

Said capsule element (A) preferably comprises, more preferably consists essentially of, a metal. Said capsule element (A) may be soluble in a liquid formulation which may be contacted subsequently with the combination of AM element and capsule element (A), so that the capsule element (A) can be removed by dissolution. Capsule element (A) may arranged to be sacrificed in a downstream process (e.g. as described in the second aspect) or may be not removed and left in place. Preferably, however, capsule element (A) is arranged to be sacrificed in a downstream process (e.g. as described in the second aspect)—that is, it is removed in a downstream process (e.g. as described in the second aspect) and does not remain in a final component. Said capsule element (A) preferably comprises, more preferably consists essentially of, a metal, for example selected from mild steel, stainless steel, titanium and aluminium.

Said capsule element (A) preferably comprises a sheet material which is secured to the AM element. The sheet material is preferably shaped to define a near net shaped region of a final component made using said capsule. Said capsule element (A), for example said sheet material, preferably has a thickness in the range of 2-5 mm, and may have thicker sections to control shape and directional densification.

Said capsule may include a capsule element (B) which is secured to (preferably directly to) the AM element. Capsule element (B) may be arranged to overlie an opening, for example a channel or pipe section, of said AM element. Said capsule element (B) and AM element are preferably secured, for example welded, so that a gas tight (e.g. to helium) seal is defined between the two elements.

Capsule element (A) and capsule element (B) are preferably spaced apart. They are preferably not contiguous.

Said capsule element (B) may be made from the same material or a different material compared to that of said AM element.

Said capsule element (B) preferably comprises, more preferably consists essentially of, a metal. Said capsule element (B) may be soluble in a liquid formulation which may be contacted subsequently with the combination of AM element and capsule element (B), so that the capsule element (B) can be removed by dissolution. Preferably, however, capsule element (B) is arranged to be sacrificed in a downstream process (e.g. as described in the second aspect)—that is, it is removed in a downstream process (e.g. as described in the second aspect) and does not remain in the final component. Said capsule element (B) preferably comprises, more preferably consists essentially of, a metal, for example selected from mild steel, stainless steel, titanium and aluminium.

Said capsule element (B) preferably comprises a sheet material which is secured to the AM element. The sheet material is preferably shaped to define a near net shaped region of the final component. Said capsule element (B), for example said sheet material, preferably has a thickness in the range of 2-5 mm, and may have thicker sections to control shape and directional densification.

Said AM element may include a surface which is an outer surface of said capsule—i.e. a surface of the capsule which is exposed to the outside. Said surface may define a selective surface, at least in part. Said AM element is preferably not fully encapsulated by other regions of said capsule.

Said void for containing powder (XX) is suitably defined, at least in part, by capsule element (A), capsule element (B), said AM element and, optionally, other capsule elements, which may have any features of capsule elements (A) and/or (B).

Said void may include an opening to provide access from outside the capsule into the capsule for example into said void of the capsule. A pipe may be associated with said opening for delivering solids and/or fluids into the void and/or removing fluids from the void, for example evacuating the void of air.

Said void may, for example prior to filling with powder (XX), be substantially empty. However, the void may contain powder (XX).

The powder (XX) preferably comprises, more preferably consists essentially of, a metal. The metal may be selected from stainless steels including austenitic, ferritic and martensitic grades, duplex and super duplex stainless steels, Ni, Ti and CoCr alloys together with metal matrix/composite alloys. The metal powder is preferably <500 microns in diameter. The metal powder may be filled up to 100% volume of the capsule void.

Powder (XX) may be the same or may have a different identity, for example it is chemically different, compared to the material which makes up the AM element. It preferably has a different identity. The powder (XX) may comprise (e.g. as a major amount) a first metal and said AM element may comprise a second metal, wherein suitably said first and second metals are different.

The powder (XX), may make up at least 10 wt %, preferably at least 20 wt %, for example 20 to 80 wt % of the total weight of said capsule.

The shape of the outer surface of the capsule may not correspond to and/or may be different compared to the shape of the AM element.

According to a second aspect of the invention, there is provided a method of producing a component, the method comprising:

(i) selecting a capsule according to the first aspect;
(ii) subjecting the capsule to HIP.

After HIP, a selective surface of said AM element in said capsule prior to HIP may be substantially identical to its form after HIP, except that it may have been densified and undergone shrinkage, for example equi-axis shrinkage. After selection of said capsule, the shape of the AM element is preferably substantially not changed, in defining said final component, other than by any change brought about by being subjected to HIP.

Prior to step (ii), said capsule may be tested, suitably to confirm that it is gas-tight. This may comprise introducing (for example via said opening which is arranged to provide access from outside the capsule into the capsule) a gas, for example helium, into the void defined in the capsule and assessing if any of the gas leaks from the capsule.

If the capsule selected does not include powder (XX), the method may comprise introducing powder (XX) into the void of the capsule.

The capsule, suitably containing powder (XX) in said void, may be vibrated, preferably to achieve a known fill weight of powder (XX) and an optimum packaging density.

The shape of the outer surface of the capsule may not correspond to and/or may be different compared to the shape of the AM element. Thus, the shape of the outer surface may not be simply configured to clad the AM element with a substantially constant thickness of a layer derived from said powder (XX).

Prior to step (ii), the method preferably comprises evacuating the capsule, for example the void defined in the capsule. A vacuum may be drawn in the capsule for example by attachment of a vacuum device to said opening which is arranged to provide access into the capsule. After evacuation of the capsule, the method preferably comprises sealing the capsule, for example closing said opening which is arranged to provide access into the capsule.

Step (ii) preferably comprises placing the capsule in a HIP system and subjecting it to a predetermined pressure (e.g. ranging between 100-200 MPa) and temperature (e.g. ranging between 500-1250° C.) for a predetermined time, for example based on material wall thickness and overall weight of the component.

Step (ii) is preferably undertaken to achieve 100% density of the AM element and powder (XX).

Thus, the component is preferably fully dense and preferably defines a final component as herein described.

In step (ii), the powder (XX) which is introduced suitably diffusion bonds to the AM element, for example metal thereof. The bonded metal powder (XX) will be of a fine homogeneous grain size with minimal segregation and the AM element will consist of a finer and less segregated structure than that obtained from conventional processes. There will suitably be no heat affected zone between bonded metal powder (XX) and AM element, since the AM element is joined by a diffusion bonding process.

Subsequent to step (ii), the method preferably comprises placing the capsule in a conventional heat treatment furnace for solution heat treatment followed by aging or precipitation hardening to achieve optimum material properties for the component.

Subsequent to step (ii) part of the capsule may be removed from association with the AM element, suitably to leave a post-treated component comprising said AM element and consolidated and HIPed powder (XX). Alternatively, the capsule may remain in place to form part of a final component, as herein described.

Removal of part of the capsule as aforesaid may be by machining. Advantageously, removal may be by dissolution, for example by use of acid etching. Capsule element (A) may be removed. Capsule element (B) may be removed. All sheet materials incorporated into the capsule may be removed.

Said component preferably comprises said AM element and HIPed powder and preferably includes no region defined by sheet material, for example sheet steel.

Suitably, after removal of part(s) of the capsule, the component is subjected to minimal machining. This is possible because the capsule is arranged to produce a near net shape. Suitably less than 50%, preferably less than 25%, more preferably less than 10% of the outer surface area of the component is treated, for example machined after removal of parts of the capsule which are not included in the final component. Preferably, after removal of part(s) of the capsule (e.g. sheet materials) which are not included in the final component, the component is not subjected to any process which is arranged to change its shape. Preferably, after removal of parts(s) of the capsule which are not included in the final component, the component is not subjected to any process which may preferentially remove any part of the component in preference to any other part of the component.

After removal of part(s) of the capsule, the component may be subjected to a process which treats substantially the entirety of at least the outer accessible surface of the component in the same manner. For example, the process may comprise a polishing and/or cleaning process.

The component made in the method may define a final component which defines, or is used in, an apparatus, machine or device which may be used in an industrial process.

According to a third aspect of the invention, there is provided a method of producing a capsule of the first aspect, the method comprising:

(i) selecting an additive manufactured (AM) element;
(ii) constructing a capsule, wherein a first region of said capsule is defined, at least in part, by said AM element.

Said first region of said capsule may be curved or planar. Said first region of said capsule preferably defines an internal wall of said capsule.

Preferably, a second region of said capsule is defined, at least in part, by said AM element. Said second region of said capsule may be curved or planar. Said second region of said capsule may define an internal wall of said capsule.

One or more other regions of said capsule may be defined by said AM element.

Said AM element may define one or more regions of said capsule, for example said first and second regions referred to and, optionally, other regions.

The method may include, prior to step (i), manufacturing the AM element, for example using laser or electron beam welding (EBW), powder bed and wire fed build techniques.

In step (ii), said method suitably comprises constructing regions of the capsule around said AM element, suitably such that said first region of said capsule is defined by said AM element and optionally, but preferably, said second region of said capsule (when provided) is defined by said AM element. Preferably, said AM element defines an internal wall of the said capsule.

Step (ii) of the method may comprise selecting a capsule element (A) and securing it to (preferably directly to) the AM element. Said capsule element (A) may be arranged to overlie at least part of said AM element. It may be arranged to overlie an extremity of the AM element. It may be arranged to overlie an opening, for example a channel or pipe section, of said AM element. It may be arranged to overlie at least part of the first region of the AM element (when provided). Said capsule element (A) and AM element may be secured together by welding, for example by tungsten inert gas (TIG) welding, Metal Inert Gas (MIG) welding or electronbeam welding. Said capsule element (A) and AM element are preferably secured, for example welded, so that a gas tight (e.g. to helium) seal is defined between the two elements.

Said capsule element (A) may be as described in the first aspect.

Step (ii) of the method may include (suitably in addition to selecting capsule element (A)), selection of a capsule element (B) and preferably securing it to (preferably directly to) the AM element. Capsule element (B) may be arranged to overlie an extremity of the AM element. It may be arranged to overlie an opening, for example a channel or pipe section of said AM element. It may be arranged to overlie at least part of the second region of the AM element (when provided). Said capsule element (B) and AM element may be secured together by welding. Said capsule element (B) and AM element are preferably secured, for example welded, so that a gas tight (e.g. to helium) seal is defined between the two elements.

Said capsule element (B) may be as described in the first aspect.

In step (ii) of the method, a capsule is suitably constructed comprising said AM element, with a void suitably being defined around at least part of the AM element. When said capsule comprises capsule element (A), the void may be defined between capsule element (A) and said AM element. The void may be defined at least in part between said AM element and capsule elements (A) and (B) when provided.

In step (ii) of the method, said capsule is preferably constructed with an opening to provide access from outside the capsule into the capsule for example into a void of the capsule. A pipe may be associated with said opening for delivering solids and/or fluids into the void and/or removing fluids from the void, for example evacuating the void of air.

In a preferred embodiment, step (ii) comprises constructing said capsule by selecting at least three individual and/or separate elements (e.g. capsule elements selected from capsule elements (A), (B) and at least one other capsule element) which suitably are made from sheet material, for example sheet metal, and associating said three elements with the AM element to define a capsule with a void defined at least in part by the AM element.

Subsequent to step (ii), said capsule may be tested, suitably to confirm that it is gas-tight. This may comprise introducing, (for example via said opening which is arranged to provide access into the capsule) a gas, for example helium, into the void defined in the capsule and assessing if any of the gas leaks from the capsule.

In a step (iii) which is suitably subsequent to step (ii), a powder (herein referred to as powder (XX)) is preferably introduced into the capsule, for example into said void defined in the capsule.

According to a fourth aspect of the invention, there is provided a supplemented AM element which comprises an AM element (herein the "as-manufactured AM element) which is preferably the product obtained after manufacturing an AM element suitably in an AM process, for example using laser or EBW powder bed or wire fed building techniques, wherein the as-manufactured AM element includes unconsolidated particulate material, for example powder; wherein the supplemented AM element includes particulate material, for example powder, in addition to the unconsolidated particulate material in said as-manufactured element. The additional particulate material may be identical to or different compared to material used in a process (e.g. an AM process) via which the as-manufactured AM element is made. Preferably, said additional particulate material is different (e.g. in identity or particle sizes/size distribution) compared to material used in the process via which the as-manufactured AM element is made.

The AM element, as-manufactured AM element and supplemented AM element of the fourth aspect may be as descried in the first aspect.

According to a fifth aspect of the invention, there is provided a method of making a supplemented AM element of the fourth aspect, the method comprising:

(i) selecting an AM element which is a product obtained after manufacturing the AM element (herein the "as-manufactured AM element) in an AM process, for example using laser or EBW powder bed or wire fed building techniques, wherein said as-manufactured AM element includes unconsolidated particulate material, for example powder; and (ii) incorporating additional particulate materials, for example powder, into the as-manufactured AM element, to define the supplemented AM element.

Said additional particulate material may contact and/or be mixed with the unconsolidated particulate material incorporated in said as-manufactured AM element.

According to a sixth aspect of the invention, there is provided a final component per se.

Any feature of any aspect of any invention or embodiment described herein may be combined with any feature of any other invention or embodiment descried herein mutatis mutandis.

Specific embodiments of the invention will now be described, by way of example, with reference to the accompanying drawings, in which:

FIG. 7a is a perspective view of a flow meter body, with a closure plate omitted in the interests of clarity;

FIG. 7b is a view of the flow meter body of FIG. 7a showing inclusion of a fill/evac tube;

FIGS. 8 to 11 show a sequence of steps involved in forming a capsule comprising the flow meter body of FIG. 7;

In the figures, the same or similar parts have the same reference numerals.

Figure 1:
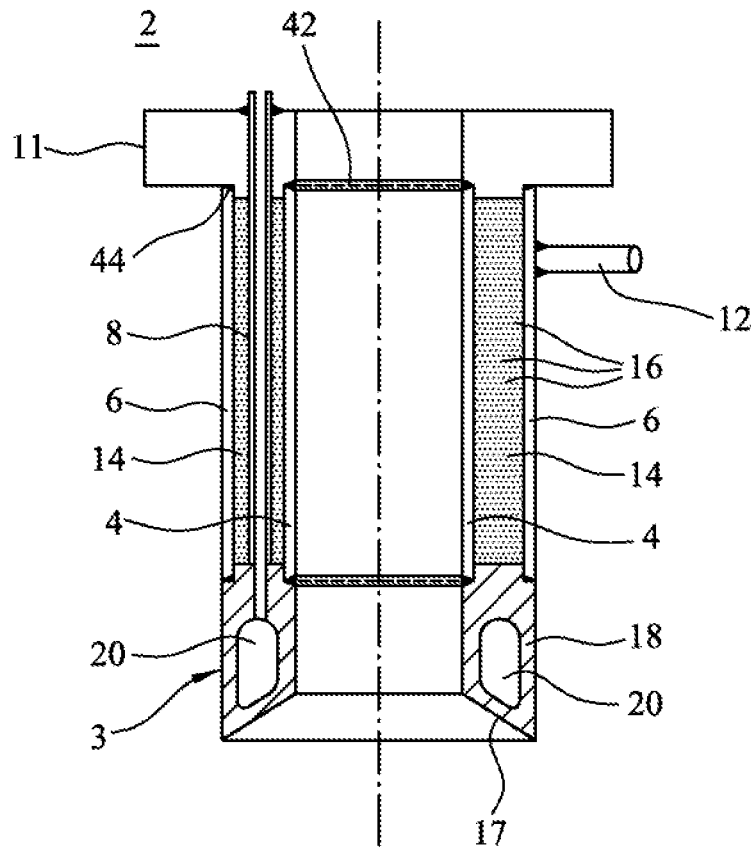
FIG. 1 is a cross-section through a capsule of a valve seat assembly.
Figure 2:
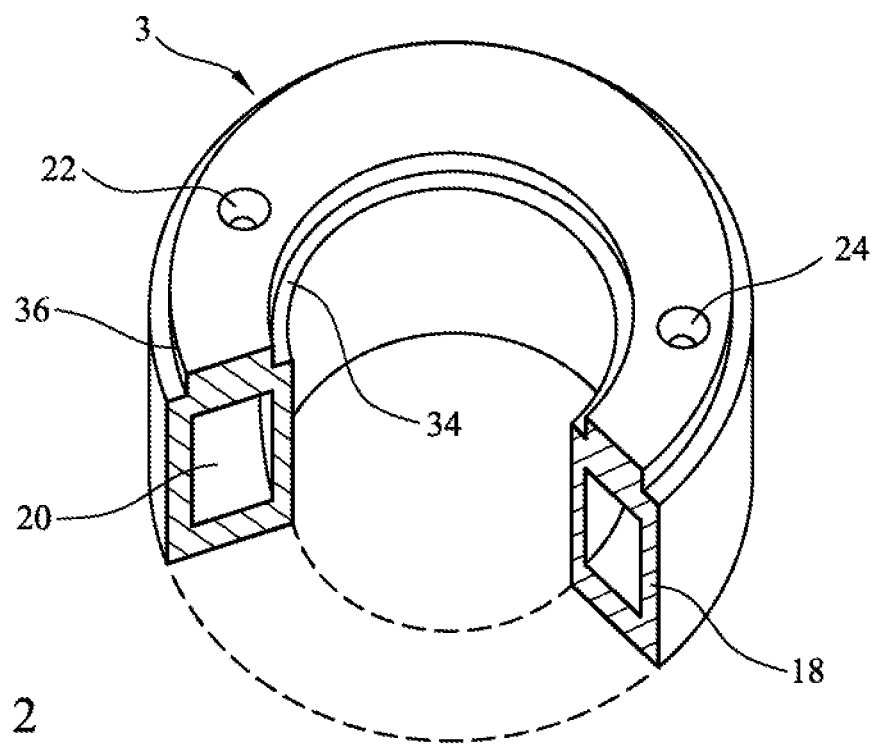
FIG. 2 is a perspective view, partly cut-away, of an AM element of the assembly of FIG. 1.

Referring to FIGS. 1 to 6, a capsule 2 for HIPing comprises a rigid, self-supporting AM component 3 which is welded to inner and outer cylindrical liners 4, 6 through which cooling channel tubes 8, 10 extend (only tube 8 is shown in FIG. 1 but both tubes 8, 10 are shown in other figures). A solid end plate 11 is welded to ends of the liners 4, 6 and tubes 8, 10 extend through the end plate 11 and open to the outside. A fill tube 12 communicates with an annular void 14 defined between liners 4, 6 which is filled with powder 16. In use, the capsule 2 is subjected to HIP as described below. Thereafter, the inner and outer liners 4, 6 are removed to define a valve seat assembly comprising the AM component 3, tubes 8, 10, HIPed powder 16 and end plate 11.

The capsule 2 and its production are described in more detail below.

The AM component 3 is manufactured using a laser powder bed 3D printing process with a single laser head. The powder used for the build is a stainless steel or a nickel-based alloy. The AM component is designed and the design supplied in a STEP format to allow a CAD model to be produced for programming of the AM build. The AM component is built layer by layer using an optimised build speed to achieve a high density wall free from porosity and defects. After the build, the AM component is stress relieved and then removed from the build plate and any support structure removed.

The AM component must be able to be TIG, MIG and/or EBW welded and also compatible for joining by welding to other parts, for example liners 4, 6 of the capsule 2.

The AM component 3 defines an annular valve seat which is made in a suitable wear resistant material. It includes a wear face 17 which is frusto-conical in shape and body 18 in which are defined cooling galleries 20 which communicate with tubes 8, 10. Tubes 8, 10 are arranged to transport a cooling fluid towards and away from the wear face to cool the wear face in use.

The AM component has a maximum diameter of about 150 mm and a maximum thickness (measured perpendicular to the maximum diameter) of about 20 mm.

Figure 3:
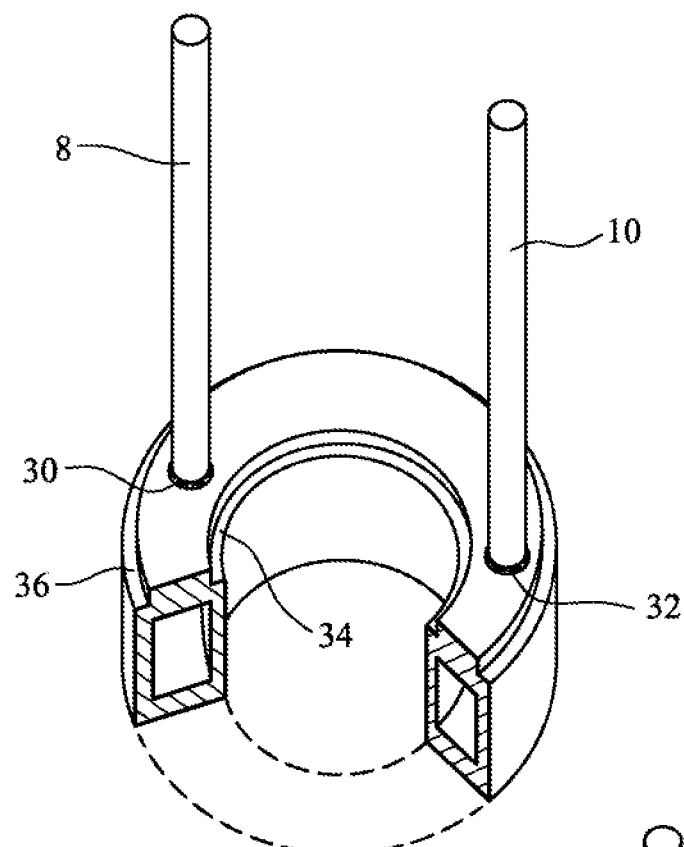
FIGS. 3 to 6 show stages in the manufacture of the assembly of FIG. 1.
Figure 4:
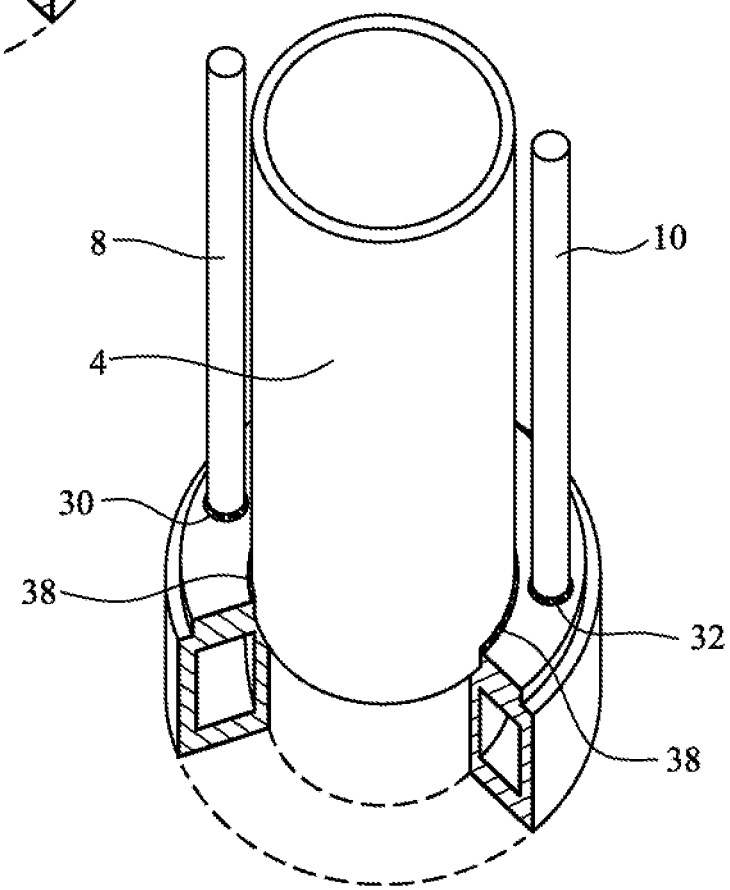

The AM component 3 also includes diametrically spaced apart openings 22, 24 (FIG. 2) which are arranged to receive tubes 8, 10 which extend beyond an end 26 of liners 4, 6 and project from outer face 28 of end plate 11. The tubes 8, 10 are welded in position as represented by weld lines 30, 32 (FIG. 3).

Figures 5, 6:
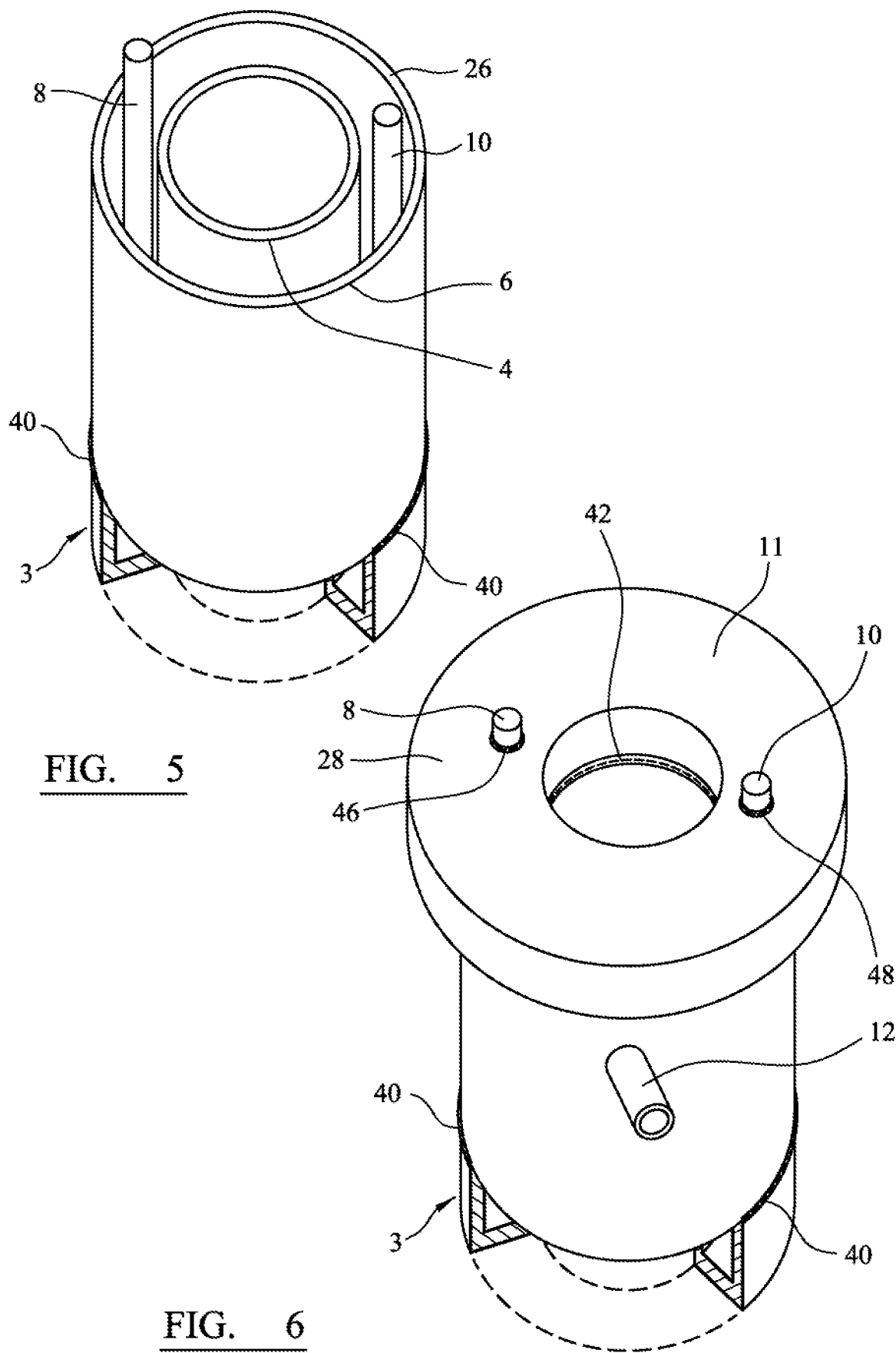

The AM component 3 also includes inner and outer annular stepped regions 34, 36. Inner stepped region 34 is arranged to engage inner circular cross-section liner 4 and outer stepped region 36 is arranged to engage outer liner 6. The inner liner 4 is arranged to be welded to the AM component as represented by weld lines 38 (FIG. 4) and the outer liner 6 is arranged to be welded to the AM component 3 as represented by weld lines 40 (FIG. 5).

The inner and outer liners 4, 6 comprise sheet metal which may be selected from mild steel, stainless steel and aluminium.

At an opposite end to the AM component, the capsule 2 includes the end plate 11 which comprises a solid material which may be stainless steel, steel or a nickel-based alloy. The end plate is arranged to be engaged with the assembly of FIG. 5. To this end, it includes annular grooves arranged to engage the free ends of liners 4, 6 and includes openings through which tubes 8, 10 may be positioned. The end plate 11 is welded to liners 4, 6 and tubes 8, 10 as represented by weld lines 42, 44, 46, 48. When so arranged, void 14 is defined between end plate 11, liners 4, 6 and AM component 3. To provide access to the void 14, fill tube 12 is welded to an outwardly facing wall of liner 6.

The steps for manufacturing the capsule 2 of FIG. 1 are represented sequentially in FIGS. 2 to 6.

After construction of the capsule of FIG. 1, it is evacuated by connecting a vacuum line to tube 12 and then is subjected to helium leak testing to ensure it is gas-tight. Next, it is filled with powdered metal via tube 12. The powdered metal is selected from stainless steels including austenitic, ferritic and martensitic grades, duplex and super duplex stainless steels, Ni, Ti and CoCr alloys together with metal matrix/composite alloys. The metal powder may be filled up to 100% volume of the capsule void. The powder fill weight is calculated based on the capsule design and the particle size distribution of the metal powder. The metal powder is filled into the capsule void and may be vibrated preferably to achieve a known powder fill weight and an optimum powder packing density.

After filling of the capsule, it is evacuated of entrapped air by connecting a vacuum line to tube 12 and pulling a vacuum. Then, tube 12 is crimped to seal the assembly.

Next, the capsule is subjected to HIP by placing it in a HIP system and subjecting it to a predetermined temperature and pressure for a predetermined time. The HIP temperature must be suitable for both the metal powder and material from which the AM component is made and is usually driven by the material (e.g. alloy) with the lowest solidus temperature.

After HIP, the capsule is placed in a heat treatment furnace for a predetermined temperature for a predetermined time in order to achieve optimum material properties for the final component.

After HIP, parts of the capsule which are not to be included in the final component may be removed. This may be done by immersion of the post-HIPed assembly in various acids and stages for a suitable time to dissolve away the sheet steel which encases the component. In particular, liners 4, 6 are dissolved away, leaving a valve seat assembly comprising said AM component 3, HIPed powder 16 with tubes 8, 10 extending there through and end plate 12. The AM component 3 is fully dense by virtue of it having been HIPed and consolidated powdered metal 16 is also fully dense by virtue of it having been HIPed. The AM component and consolidated powdered metal are diffusion bonded to one another by virtue of the HIP process. The metallic or bi-metallic component produced has no porosity or defects. The consolidated powdered metal part will have a fine homogenous grain size and the AM component will consist of a very fine grained structure that will be homogenised and reveal less segregation than the as built condition due to the treatment of the AM element during the HIP cycle. The joining of the AM component to the powder component takes place by diffusion bonding of the powder particle surfaces to the AM component without any melting or liquid phases which eliminates the presence of a heat affected zone, this being replaced by a thin 10-50 micron diffusion zone between the powder and the AM component.

Similarly, the end plate 11 and consolidated powdered metal are diffusion bonded to one another by virtue of the HIP process. This takes place without any melting or liquid phases which eliminates the presence of a heat affected zone, this being replaced by a thin (10-50 micron) diffusion zone between the powder and AM component.

Advantageously, the AM component 3 does not require any machining (or other metal removal process) after HIP and removal of parts of the capsule which are not to be included in the final component. The AM component defines wear face 17 which is a selective surface which cooperates with another part of a valve (e.g. an intake or exhaust valve) (not shown). The wear face 17 is made to a close tolerance (e.g. +/−0.2 to 0.3 mm) in the process so that it can accurately engage the other part of the valve.

Other parts of the final component (which may not include selective surfaces and/or which can be made to lower tolerances compared to that of the AM component) may be subjected to some machining (e.g. a clean-up operation on end plate 11 and/or bores).

Referring to FIG. 7*a*, an AM component 52 is arranged to define a selective surface of a fluid flow measuring device, treated in a HIP process.

The AM component 52 of FIG. 7*a* is manufactured using a laser powder bed 3D printing process as described for the FIG. 1 embodiment. However, in contrast to the FIG. 1 embodiment, the AM component includes powder which has not been consolidated by laser treatment in the manufacturing process. Thus, the AM component 52 includes a fully-fused area 54, defined to the left of line 56 shown in FIG. 7*a*. The fully-fused area defines a selective surface of component 52 which generally require no post-HIP machining.

To the right of line 56, relatively thin, solid, outer wall 58 which is part circular is defined by the laser fully fusing powder in the powder bed. The outer wall extends up from a generally circular, solid, planar base 60 which is also defined by the laser fully fusing powder in the powder bed. Inwards of the outer wall 58, support posts 62 are defined which are produced by the laser fully fusing powder in the powder bed. The support posts 62 extend upwardly from the base 60 and are arranged to support a planar top 64 (omitted from FIG. 7*a* in the interests of clarity, but shown in FIG. 8) which is formed by fusion of powder by energy from the laser.

Defined inwards of the outer wall 58 is an opening 65 defined by wall 66 which is produced by the laser fully fusing powder in the powder bed. Between the outer wall 58, wall 66, base 60 and top 65, the AM component 52 includes a volume 53 which includes unconsolidated powder—i.e. powder which has not been impinged by the laser to melt it.

The ratio of the sum of the cross-sectional areas of the support posts (immediately below the planar top 64) divided by the area defined between the posts (immediately below the planar top 64) in which unconsolidated powder is arranged may be in the range 0.25 to 0.55, preferably in the range 0.3 to 0.45, more preferably in the range 0.33 to 0.42.

The ratio of the sum of the volumes occupied by all the support posts divided by the volume surrounding the support posts and/or occupied by unconsolidated powder may be in the range 0.25 to 0.55, preferably in the range 0.3 to 0.45, more preferably in the range 0.33 to 0.42.

The AM component has a thickness x (FIG. 7*a*) of about 40 mm, a width y of about 30 mm and the diameter between points Q and R is about 100 mm.

Thus, the AM component 52 of FIG. 7*a* defines a selective surface (which includes a cut-out volume 55) and other regions which comprise fully fused powder, together with a volume of powder which is not consolidated but is arranged between the support posts 62. By virtue of this arrangement, the AM component can be made much more rapidly (and with less energy usage) compared to a case wherein the entirety of the powder used for the component 52 is consolidated with the laser, during additive manufacturing.

The AM component 52 may be included in a capsule 70 (FIG. 11) as described with reference to FIGS. 8 to 11. However, before incorporation, additional powder is introduced, via a fill/evac tube 57 (FIG. 7*b*), into volume 53 to supplement the powder therein. The additional powder is packed into volume 53 and is arranged so that, after HIPing of AM component 52, the powder and posts 62 in volume 53 define a volume having a density of greater than 98% (of its fully dense density) and the volume may be substantially fully dense.

Advantageously, the tube 57 may be incorporated into the AM component 52 during manufacture of the AM component.

Referring to FIG. 8, the AM component 52 is represented including a cut-away portion 72 of the top 67 to show unconsolidated powder 74 within the component 52, although it will be appreciated that the volume which includes the powder is in reality fully closed by parts of the AM component. The AM component 52 may be incorporated in capsule 70 whilst including unconsolidated powder 74. However, in a preferred embodiment, additional powder is incorporated into volume 53 as described with reference to FIG. 7*b* and component 52 is then HIPed as described herein before it is incorporated into capsule 70. This may reduce the risk of failure of the AM component 52.

Figure 9:
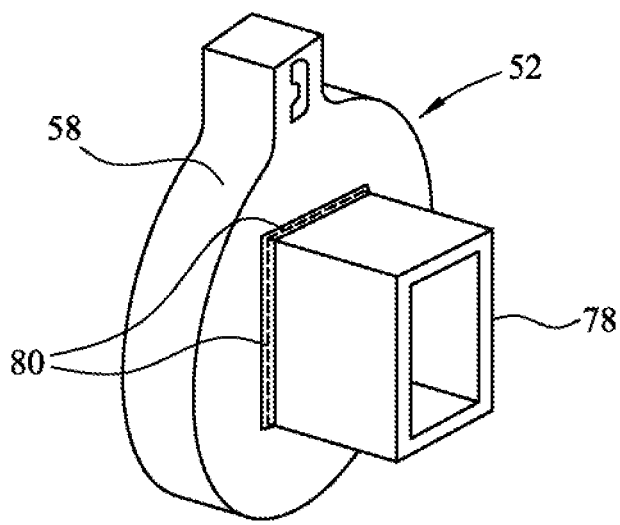

Referring to FIG. 9, a tapered tube 78, having a square cross-section, is welded (see weld lines 80) around opening 65. The tube 78 may be made from nickel alloy.

Figure 10:
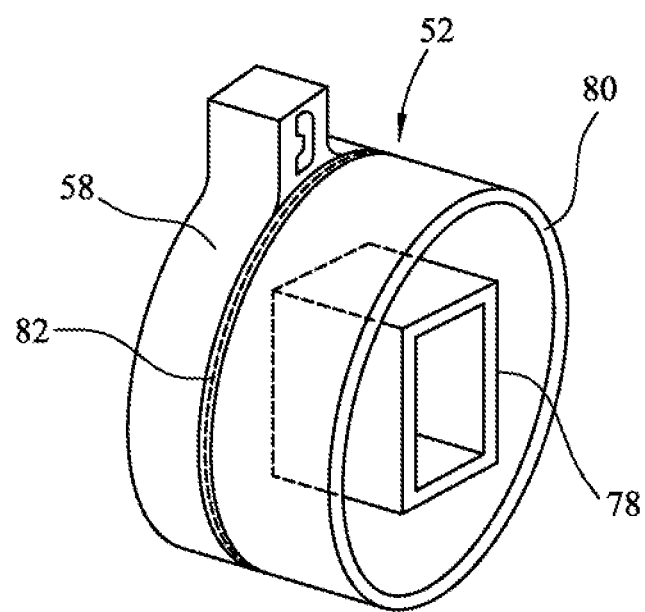

Next, referring to FIG. 10, an outer, circular cross-section, sleeve 80 is positioned around tube 78 and it is welded to the AM component 52 along weld line 82. The outer sleeve 80 may be made from mild steel, stainless steel, titanium or aluminium.

Figure 11:
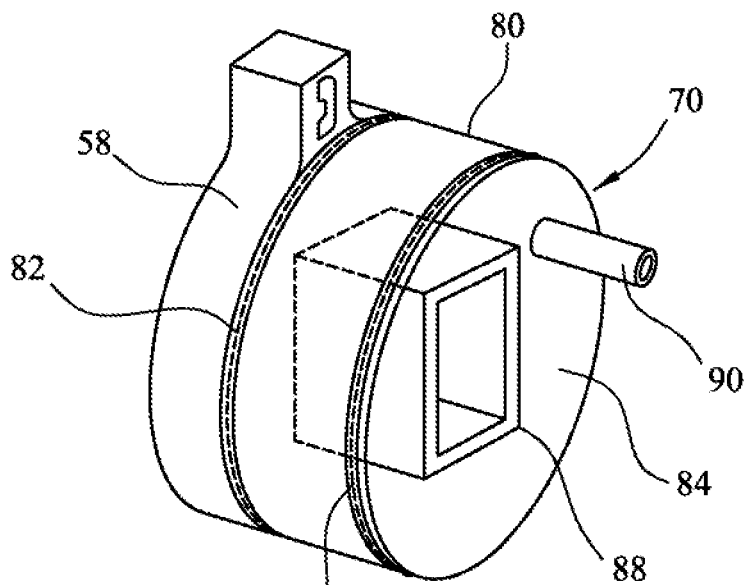

Next, referring to FIG. 11, a closure plate 84 (which may be made of the same material as outer sleeve 80) is welded to sleeve 80 along weld line 86 and to an outer edge of the tapered tube 78 along weld line 88. A fill tube 90 extends through and is welded to the closure plate 84.

After construction of the capsule of FIG. 11, it is evacuated, tested, filled with powder and subjected to HIP as described for the embodiment of FIGS. 1 to 6. After HIP, it is placed in a heat treatment furnace as described above and thereafter the outer sleeve 80, closure plate 84 and fill tube 90 are removed, for example by dissolution in acid.

Figure 12:
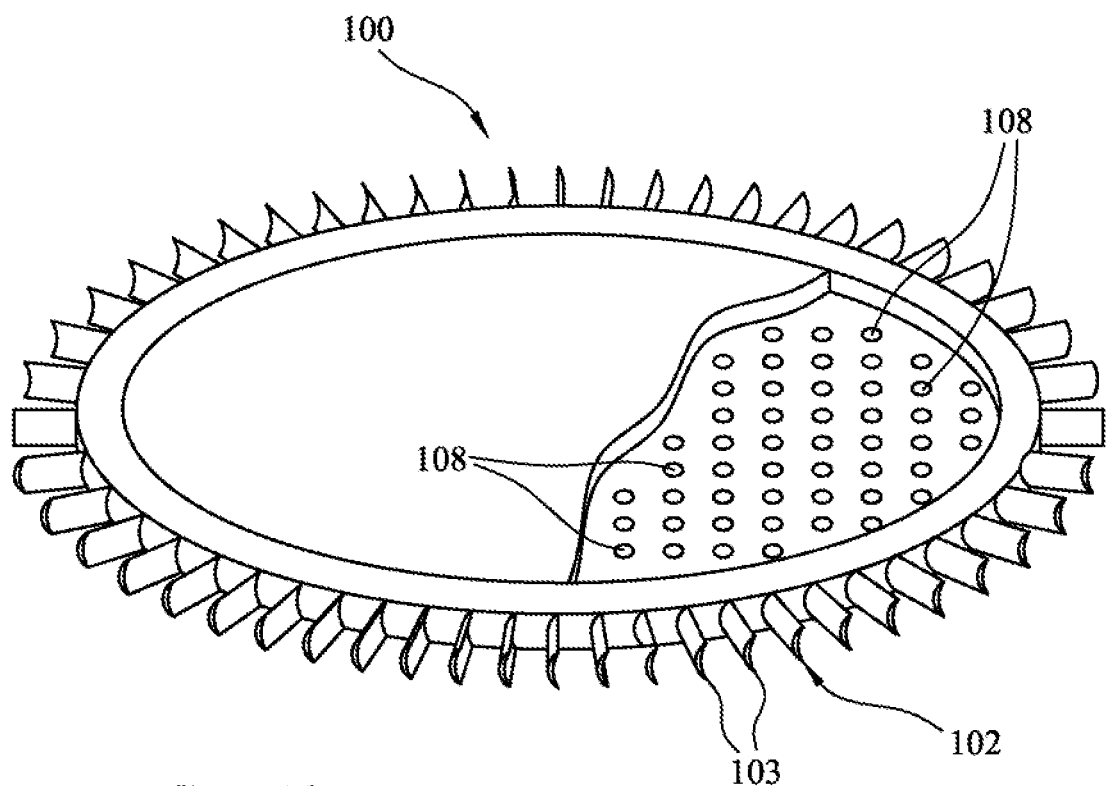
FIG. 12 is a perspective view, partly cut-away, of a turbine disc.
Figure 14:
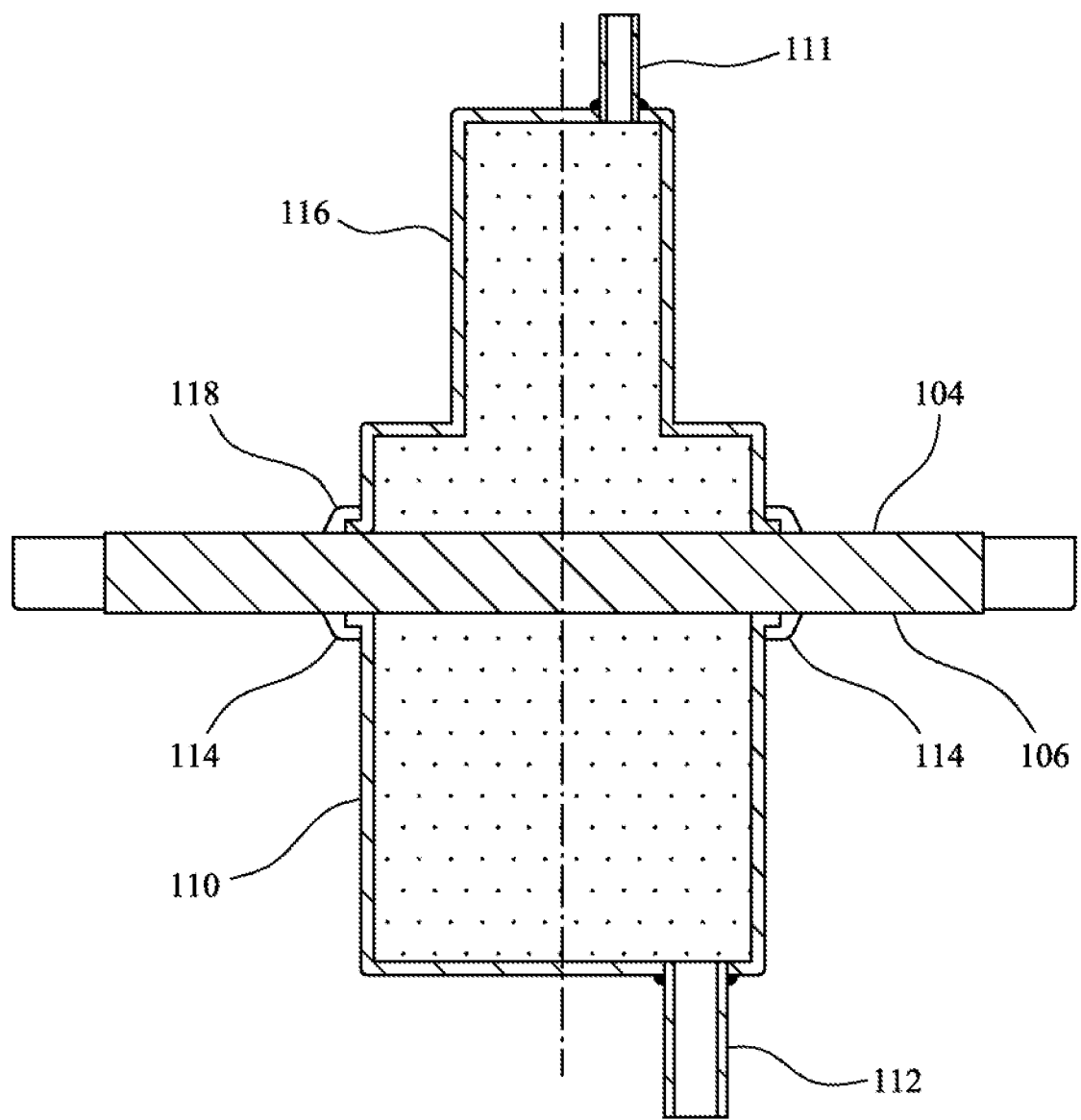
FIG. 14 is a cross-section through the assembly of FIG. 13.

Referring to FIG. 12, a turbine disc 100 (approximate diameter of 200 mm and thickness of 20 mm) is arranged to define a selective surface of a turbine wheel assembly. The disc 100 is manufactured using a laser powder bed 3D printing process as described for the FIG. 7 embodiment and therefore defines an AM component. The disc includes an annular blade ring 102 incorporating arcuate vanes 103 around its entire periphery. Inwards of the blade ring 102 are spaced apart, circular, closure plates 104, 106 (FIG. 14). Extending between the plates 104, 106 is an array of spaced apart support posts 108 which are defined by the laser fully fusing powder in the powder bed during manufacture of the disc 100. Between the plate 104, 106 and the posts 108, the disc 100 includes a volume which includes unconsolidated powder—i.e. which has not been impinged by the laser to melt it. The area/volume occupied by the posts and unconsolidated powder may be as described for the component 52.

Thus, the turbine disc of FIG. 12 defines a selective surface (i.e. comprising ring 102 and vanes 103); and other regions (e.g. plates 104, 106 and posts 108) which comprise fully fused powder, together with a volume of powder 108 which is not consolidated. As described for the FIG. 7 embodiment, the disc can be made more rapidly (and with less energy usage) compared to a corresponding disc wherein there is no unconsolidated powder. In a preferred embodiment, the disc 100 of FIG. 12 includes a fill/evac tube (not shown) via which additional powder is introduced to supplement powder 108. The disc 100 is preferably HIPed as described herein before being incorporated into a capsule. After HIPing, the disc 100 may be substantially fully dense.

Figure 13:
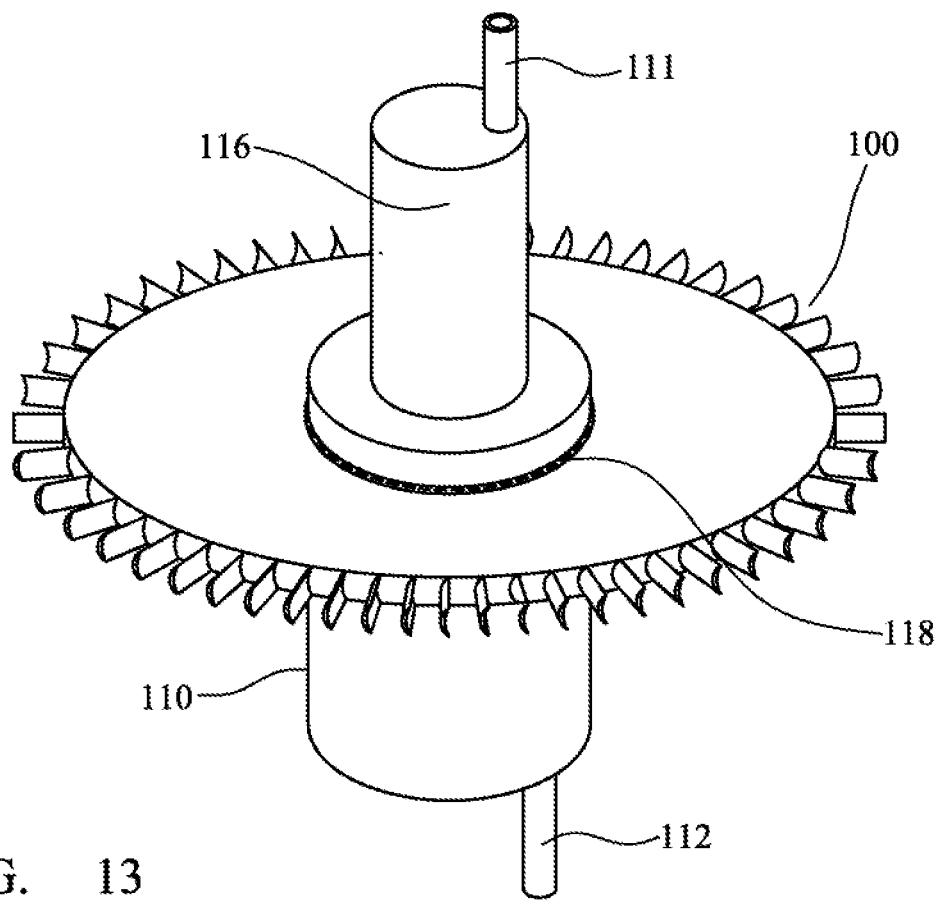
FIG. 13 is a perspective view of a capsule comprising the turbine disc of FIG. 12.

A capsule incorporating the disc 100 (which has preferably been HIPed as described) may be manufactured as shown in FIGS. 13 and 14. Referring to the figures, a cylindrical cap 110 incorporating a fill tube 112 is welded about its periphery at 114 to closure plate 106. A stepped cap 116, which includes fill tube 111, is welded about its periphery 118 at its lower end to closure plate 104.

The cylindrical cap 110 and stepped cap 116 may be made from mild steel, stainless steel, titanium or aluminium.

After construction of the capsule of FIGS. 13 and 14, it is evacuated, tested, filled with powder and subjected to HIP as described for the previous embodiments. After HIP, it is placed in a heat treatment furnace as described and, thereafter, caps 110, 116 including respective fill tubes 112, 111 are removed, for example by dissolution in acid.

Advantageously, the method may be used to produce relatively large components (e.g. having a maximum dimension of about 400 mm which incorporate selective surfaces which are accurately produced (and are arranged to cooperate in use with another surface or part) and other surfaces which are not selective surfaces and/or which may be made less accurately and/or with wider tolerances compared to the selective surfaces. Using the method described, components may be produced relatively rapidly and efficiently.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A capsule for hot isostatic pressing (HIPing) comprising:
   (i) an additive manufactured (AM) element, wherein said AM element includes a first volume which has density of less than 100% of its fully dense density;
   (ii) a capsule element (A), wherein said capsule element (A) is arranged to define at least part of a void for containing a powder arranged to be subjected to hot isostatic pressing (HIP), wherein capsule element (A) is secured to the AM element and is made from a different material compared to that of said AM element and capsule element (B) is secured to the AM element and is made from a different material compared to that of said AM element;
   wherein said AM element includes a second volume which has a density which is less than that of the first volume, wherein said second volume includes unconsolidated powder which is flowable within a volume (A); and
   wherein volume (A) comprises support elements which extend between upper and lower walls which define volume (A).

2. The capsule according to claim 1, wherein said AM element includes an opening which extends from a first position on the AM element to a second position on the AM element, with a void being defined between the first and second positions.

3. The capsule according to claim 1, wherein said AM element includes an array of substantially identical parts, for example teeth.

4. The capsule according to claim 1, wherein said AM element includes a first volume which has a density of 98% of its fully dense density or greater.

5. The capsule according to claim 1, wherein the density of the second volume is less than 80% of its fully dense density.

6. The capsule according to claim 1, wherein the density of the second volume is in the range 50-65% of its fully dense density.

7. The capsule according to claim 1, wherein said volume (A) includes at least 40 support elements.

8. The capsule according to claim 1, wherein said support elements are support posts.

9. The capsule according to claim 8, wherein the support posts have a thickness of at least 0.1 mm, in the range 0.1 to 1 mm.

10. The capsule according to claim 8, wherein, in volume (A), the ratio of the sum of the cross-sectional areas of the support posts immediately below a supported wall of the AM component divided by the area defined between the support elements immediately below the supported wall in which unconsolidated powder is arranged is in the range 0.25 to 0.55.

11. The capsule according to claim 1, wherein, in volume (A), the ratio of the sum of the volumes occupied by all of the support elements divided by the volume surrounding the support elements is in the range 0.25 to 0.55.

12. The capsule according to claim 1, wherein the volume (A) is fully enclosed by a solid wall of the AM element.

13. The capsule according to claim 1, wherein said AM element of said capsule for HIPing comprises the direct product of an AM process for making the AM element or comprises an AM element wherein additional powder has been incorporated into an AM element which is the direct product of an AM process.

14. The capsule according to claim 1, wherein said AM element is designed and constructed to be able to hold a gas tight seal and/or retain a gas tight membrane during HIP at high temperatures and pressures.

15. The capsule according to claim 1, wherein the outer shape and/or entire outer surfaces of the AM element are a direct product of an AM manufacturing technique.

16. The capsule according to claim 1, wherein said capsule element (A) comprises a sheet material which is secured to the AM element.

17. The capsule according to claim 1, wherein said capsule element (B) comprises a sheet material which is secured to the AM element.

18. The capsule according to claim 1, wherein said AM element includes a surface which is an outer surface of said capsule.

19. The capsule according to claim 1, wherein said AM element is not fully encapsulated by other regions of said capsule.

20. The capsule according to claim 1, wherein a void for containing powder (XX) is defined, at least in part, by capsule element (A), capsule element (B), said AM element and, optionally, other capsule elements.

21. The capsule according to claim 1, which includes powder (XX) which makes up at least 10 wt % of the total weight of said capsule.

22. A method of producing a component, the method comprising:
   (i) selecting a capsule according to claim 1;
   (ii) subjecting the capsule to HIP.

23. The method according to claim 22, wherein subsequent to step (ii) part of the capsule is removed from association with the AM element.

24. The method according to claim 22, wherein less than 50% of the outer surface of the component is treated after removal of parts of the capsule which are not included in the component.

25. A method of producing a capsule according to claim 1, the method comprising:
(i) selecting an additive manufactured (AM) element;
(ii) constructing a capsule, wherein a first region of said capsule is defined, at least in part, by said AM element.

26. The method according to claim 25, wherein the method includes, prior to step (i), manufacturing the AM element.

27. The method according to claim 25, wherein step (ii) of said method comprises constructing regions of the capsule around said AM element so that a first region of said capsule is defined by said AM element and, optionally, a second region of said capsule is defined by said AM element.

28. The method according to claim 25, wherein step (ii) comprises constructing said capsule by selecting at least three individual and/or separate elements which are made from sheet material and associating said three elements with the AM element to define a capsule with a void defined at least in part by the AM element, wherein, subsequent to step (ii), a powder (XX) is introduced into a void in the capsule.

\* \* \* \* \*